(12) United States Patent
Guerreiro et al.

(10) Patent No.: US 10,388,008 B2
(45) Date of Patent: Aug. 20, 2019

(54) DETECTION OF LENS CONTAMINATION USING EXPECTED EDGE TRAJECTORIES

(71) Applicant: CONTINENTAL AUTOMOTIVE GMBH, Hannover (DE)

(72) Inventors: Rui Guerreiro, Hove (GB); Alexander Kadyrov, Eastbourne (GB)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/834,601

(22) Filed: Dec. 7, 2017

(65) Prior Publication Data
US 2018/0096474 A1    Apr. 5, 2018

Related U.S. Application Data

(63) Continuation of application No. PCT/EP2016/063650, filed on Jun. 14, 2016.

(30) Foreign Application Priority Data

Jul. 2, 2015 (EP) .................................... 15174937

(51) Int. Cl.
*G06K 9/00* (2006.01)
*G06T 7/00* (2017.01)
(Continued)

(52) U.S. Cl.
CPC .............. *G06T 7/0002* (2013.01); *G06T 7/13* (2017.01); *G06T 7/248* (2017.01);
(Continued)

(58) Field of Classification Search
CPC . G06T 2207/10016; G06T 2207/10028; G06T 2207/20021; G06T 2207/20076;
(Continued)

(56) References Cited

U.S. PATENT DOCUMENTS

| 2014/0010408 A1* | 1/2014 | Irie ..................... G06K 9/00791 382/103 |
| 2014/0321701 A1 | 10/2014 | Halimeh et al. |
| 2015/0030204 A1* | 1/2015 | Lee .......................... G06T 7/246 382/103 |

FOREIGN PATENT DOCUMENTS

| EP | 2682315 A1 | 1/2014 |
| EP | 2682898 A1 | 1/2014 |
| EP | 2351351 B1 | 9/2015 |

OTHER PUBLICATIONS

International Search Report and Written Opinion dated Aug. 25, 2016 from corresponding International Patent Application No. PCT/EP2016/063650.

(Continued)

*Primary Examiner* — Amara Abdi

(57) ABSTRACT

A method for detecting contaminations on a lens of a vehicle camera. Transition values are assigned to pixels of image frames. Three-dimensional coordinates are assigned to the pixels by using a simplified model of the scene. Using the assigned coordinates and movement data, trajectories are assigned to the pixels. An expectation value is derived from a transition value of a starting pixel of a trajectory and a satisfied transition value is derived from transition values along the trajectory. The expectation value and the satisfied transition value are accumulated over time, and a cleanliness value is derived from a ratio of the accumulated satisfied transition value to the accumulated expectation value.

14 Claims, 16 Drawing Sheets

(51) Int. Cl.
*G06T 7/13* (2017.01)
*G06T 7/246* (2017.01)

(52) U.S. Cl.
CPC ............... *G06T 2207/10016* (2013.01); *G06T 2207/10028* (2013.01); *G06T 2207/20021* (2013.01); *G06T 2207/20076* (2013.01); *G06T 2207/30168* (2013.01); *G06T 2207/30241* (2013.01); *G06T 2207/30252* (2013.01)

(58) Field of Classification Search
CPC . G06T 2207/30168; G06T 2207/30241; G06T 2207/30252; G06T 7/0002; G06T 7/13; G06T 7/248
See application file for complete search history.

(56) References Cited

OTHER PUBLICATIONS

European Search Report dated Feb. 20, 2016 for corresponding German Patent Application No. 15174937.1.
Zhou, Changyin, et al, "Removal of Image Artifacts Due to Sensor Dust," 2007 IEEE Conference on Computer Vision and Pattern Recognition, Minneapolis, MN, Jun. 2007, pp. 1-8.
Gu, Jinwei, et al, Removing Image Artifacts Due to Dirty Camera Lenses and Thin Occulders, ACM Transactions on Graphics (Proceedings of SIGGRAPH Asia), Dec. 2009, pp. 1-10.

\* cited by examiner

DETECTION OF LENS CONTAMINATION USING EXPECTED EDGE TRAJECTORIES

CROSS REFERENCE TO RELATED APPLICATION

This application claims the benefit of International application No. PCT/EP2016/063650, filed Jun. 14, 2016, which claims priority to European patent application No. 15174937.1, filed Jul. 2, 2015, each of which is hereby incorporated by reference.

TECHNICAL FIELD

The technical field relates generally to a method and evaluation unit for detecting contaminations on a lens of a vehicle camera.

BACKGROUND

Present day passenger vehicles are increasingly equipped with camera-based assistance systems, which capture the surrounding environment of the vehicle, and provide a variety of functions for improving driving safety and comfort. The functionality of these systems is based on the analysis of the recorded image data. Therefore, the quality of the system's predictions is directly related to the quality of the image data.

One factor that affects the image quality and which is difficult to control is the degree of contamination of the optical system of the camera. The cameras may be positioned at places with less risk of contamination, or the cameras may be cleaned by an electric wiper. Despite of these provisions, it is impossible to avoid a contamination of the optical system completely. Therefore, it has been proposed to detect dirt particles on a camera lens automatically in order to trigger an appropriate action. An example for such an automatic detection of lens contaminations is disclosed in the European patent application No. EP 2351351.

SUMMARY

The present specification discloses a method and corresponding device for detecting contaminations on a lens of a vehicle camera.

Image data, which includes image frames is received from the vehicle camera or from multiple vehicle cameras over a data connection, such as an automotive data bus or a data cable of the camera.

Transition values are assigned to pixels of the image frames using a transition indicator. The transition values indicate whether there is a clearly recognizable intensity transition from dark to bright or from bright to dark at a corresponding pixel location of the frame. The transition may in turn indicate that there is a corner, an edge or another type of feature point at the corresponding location.

A transition indicator is an operator or a filter, such as a Laplace detector or a Harris corner detector, which is applied to the pixel values of the frame and generates transition values, which are associated to the pixels of the image. Herein, a pixel may also stand for a low resolution pixel, which corresponds to multiple adjacent pixels of the frame. The operator or filter can be provided by a function of the pixels in the vicinity of a pixel, which assigns a transition value to the pixel. In particular, the function can be a linear function of the pixel values, which can be represented by a matrix, such as a convolution matrix.

Three-dimensional coordinates are assigned to the pixels using a model of the exterior scene. For example, in a simple model the scene is divided into a ground surface and into regions comprising vertical objects with surfaces that are aligned in parallel to the road boundaries, such as houses and walls at the side of the road. Further information, such as surface recognition via vanishing lines or stereo images may be used to improve the accuracy of the three-dimensional coordinates.

The assigned three-dimensional coordinates and movement data of the vehicle is used to assign trajectories to the pixels, the movement data being provided by one or more vehicle sensors, such as CAN data comprising velocity and steering angle, camera data, ego-motion data which is derived from the camera data, etc. In particular, the ego-motion data may be derived from cameras of a surround view system. In a simple example, a trajectory can be defined by only two points, such as a starting point (x0, y0) and an end point (x, y).

According to pre-determined criteria such as criteria for the accuracy of the estimated motion vector, it is decided whether a motion vector is assigned to a pixel. For those pixels and frames to which a trajectory is assigned, an expectation value and a satisfied transition value are computed.

The expectation value is derived from a transition value of a starting pixel of the trajectory. The trajectory may extend forwards or backwards in time and it comprises pixels of a set of adjacent image frames.

The satisfied transition value is derived from transition values along the trajectory, which begins with the starting pixel and extends over a set of frames that are adjacent to the frame of the starting pixel.

The expectation value and the satisfied transition value are accumulated over time, wherein time is represented by the frame index. A cleanliness value of a corresponding location of the camera lens is derived from a ratio of the accumulated satisfied transition value to the accumulated expectation value.

The cleanliness value, which is derived from accumulated quantities, and the accumulated quantities themselves may have a well-defined value, even if the pixel location in the current frame does not have an associated trajectory. If the available information is not sufficient to update the accumulated quantities, the cleanliness value is computed based on the previous values, which were obtained as a result of the last update.

In particular, the accumulation over time may comprise update rules according to which a new accumulated value is derived from a weighted average of the previous accumulated value and a new value of the expectation value or of the satisfied transition value. The weighting factor is determined by the magnitude of the transition value at the starting point of the trajectory. A stronger transition value results in—or contributes to—a higher weight for the new value and a smaller weight for the previous value.

According to a further embodiment, the expectation value Tot(x, y) and the satisfied transition value Sat (x, y) of a pixel location (x, y) are updated based on at least two quantities, wherein the quantity is chosen which has the highest value, i.e. which gives the strongest indication.

The first quantity indicates if there is a clearly visible transition at the pixel location (x, y) and the second quantity indicates whether a transition is found at (x, y) that corresponds to the transition at a starting point (x0, y0) of the trajectory.

According to one embodiment, the first value is computed as a weighted sum of the previous accumulated satisfied transition value and the value one, if the transition value at the pixel is equal to one, and it is set to zero, if the transition value is less than one. Setting the first value to zero is equivalent to disregarding the value.

According to a further embodiment, the expectation value Tot(x, y) and the satisfied transition value Sat (x, y) of a pixel location (x, y) are updated based on at least three quantities, wherein the quantity is chosen which has the highest value, i.e. which gives the strongest indication.

The first quantity indicates if there is a clearly visible transition at the pixel location (x, y), the second quantity indicates whether a transition is found at (x, y) that corresponds to the transition at a starting point (x0, y0) of the trajectory with respect to a trajectory that progresses forwards in time, the third quantity indicates whether a transition is found at (x, y) that corresponds to the transition at a starting point (x0, y0) of the trajectory with respect to a trajectory that progresses backwards in time.

According to one embodiment, only cleanliness values are considered which are based on a sufficiently high expectation value. The accumulated expectation value Tot(x, y) is compared with a predetermined threshold. In particular, the threshold may be 0.9 or higher.

If the expectation value is greater than the pre-determined threshold, the cleanliness value C(x, y) of the pixel is the ratio of the accumulated satisfied transition value with the accumulated expectation value. If the expectation value is less than the pre-determined threshold, the cleanliness value C(x, y) of the pixel is represented as "undetermined", for example by assigning no value or by assigning a value representing the status "undetermined".

In particular, the transition values can be computed as a two dimensional convolution of a filter with the pixels of an image frame and assigning the resulting transition value to the respective high resolution or low resolution pixels. Pixels at the image boundaries may be disregarded, a one-sided transition value can be assigned to the boundary pixels or a suitable outer boundary may be provided, such that the boundary pixels become inner pixels. Specifically, a filter can be chosen which provides a discrete approximation to a magnitude of a Laplace operator.

In order to identify the clearly visible transitions, the computation of the transition values may furthermore comprise comparing the pixel transition values with a detection threshold and setting the respective transition value to one if the respective transition magnitude value is greater than the detection threshold. Thereby, the transition value becomes a value between 0 and 1 and can be interpreted as a detection probability.

If a threshold is provided and a value exactly meets the threshold, the output value depends on the implementation. Often, a result is not sensitive to exact values but only to ranges of values. In this case, the output value can be the same as for values above or below the threshold or it could be some value in between.

In order to speed up the computation and to relax the requirements on the trajectory computation, the method may furthermore comprise the computation of low-resolution transition values of low-resolution pixels. As a consequence, the further computation steps, such as the update equations, the time accumulation and the computation of the cleanliness value are based on the low-resolution pixels.

The computation of the low-resolution transition values comprises dividing the image frames into disjoint subregions and computing low resolution transition values by selecting maximum values of the transition values in the respective subregions. The low resolution transition values are stored in a memory, such as a circular buffer, for a predetermined number of image frames. The circular buffer is also referred to as ring buffer of "FIFO buffer". The low resolution transition values are then used to compute the corresponding expectation values and the corresponding satisfied transition values.

The movement data may be provided in various ways. According to one embodiment, the movement data is provided by a vehicle speed sensor and a steering angle sensor. According to another embodiment, the movement data is provided by an ego-motion computation, which is derived from at least one vehicle camera sensor.

The assignment of motion vectors, or of a trajectory, to the pixels is done using a simplified model of a surrounding scene. According to one embodiment, the simplified model comprises a horizontal ground surface, a left region of vertically oriented objects and a right region of vertically oriented objects.

The prediction of a trajectory is particularly simple for a straight movement of a car. According to one embodiment sets of nearby frames are identified for which the vehicle is moving essentially in a straight line, or in a straight line within a predetermined margin. The accumulated expectation value and the accumulated satisfied transition value are then updated for the identified frames only.

In a further aspect, the present specification discloses a computer program product with computer readable code for executing the aforementioned method.

According to a further aspect, the present specification discloses an evaluation unit. The evaluation unit comprising an input connection for receiving image data and a circular buffer for storing a predetermined number of image frames.

The evaluation unit is operative to execute the aforementioned method by providing suitable electronic components such as integrated circuits, such as a microprocessor, an ASIC, and computer memory for storing computer readable code and data, such as EPROMs, EEPROMS, flash memory and so forth. In particular, the evaluation unit is operative to receive image data from the vehicle camera via the input connection, which comprises images frames.

The evaluation unit assigns transition values to pixels of the image frames using a transition indicator and assigns three-dimensional coordinates to the pixels using a model of the exterior scene. In particular, the model can be represented by computer readable instructions, which process input data from the camera or from the cameras and assign three-dimensional coordinates to the pixels of the image frames.

Furthermore, the evaluation unit is operative to use the assigned three-dimensional coordinates and movement data of the vehicle to assign trajectories to the pixels. The movement data, which is received over the input connection, is provided by one or more vehicle sensors, such as a speed sensor, a steering angle sensor or camera sensors. The input connection may comprise separate connection lines for camera data and other data. In particular, the velocity, the steering angle or the ego-motion data may be provided by an automotive data bus, such as a CAN bus.

Furthermore, the evaluation unit is operative to compute, for pixels to which a trajectory is assigned, a respective expectation value for the pixels, which is derived from a transition value of a starting pixel of the trajectory, and to compute a satisfied transition value for the pixel location. The satisfied transition value is derived from transition values along the trajectory that begins with the starting pixel for a set of frames in the circular buffer that are adjacent to the frame of the starting pixel.

Furthermore, the evaluation unit is operative to accumulate the expectation value and the satisfied transition value over time and to derive a cleanliness value from a ratio of the accumulated satisfied transition value to the accumulated expectation value.

Specifically, the respective accumulated values may be stored in arrays Sat(x, y) and Tot(x, y), which may be stored in a permanent memory such that they are available when the evaluation unit is powered on. For faster access, the arrays may also be provided in a read and write memory during operation of the evaluation unit.

Furthermore, a results buffer can be provided for storing the cleanliness values C(x, y) and an output connection can be provided for outputting the cleanliness values C(x, y). However, the input connection may also be used as output connection in case of a two-way data traffic. In particular, the evaluation unit may comprise a connection for connecting it to a further image processing unit, which evaluates the image frames using the information about the lens soiling.

Furthermore, the evaluation unit may comprise a power connection for receiving electric power from a battery power supply of a car.

In particular, the buffer for storing the image frames can be provided as a circular buffer. The circular buffer may be realized using pointers to the memory areas of the respective frames. Thereby, a shifting of memory content can be avoided and the last frame may simply be overwritten by a new incoming frame.

According to a further embodiment, the evaluation unit is operative to compare the accumulated expectation value with a predetermined threshold and to set the cleanliness value of the pixel to the ratio of the accumulated satisfied transition value to the accumulated expectation value, if the expectation value is greater than the pre-determined threshold. The cleanliness value of the pixel is represented as "undetermined" if the expectation value is less than the pre-determined threshold.

According to a further embodiment, the evaluation unit is operative to compute the transition values as a two-dimensional convolution of a filter with pixels of an image frame pixel.

According to yet a further embodiment, the evaluation unit is operative to compare the pixel transition values with a detection threshold and to set the respective transition value to one if the respective transition value is equal or greater than the detection threshold.

According to yet a further embodiment, the evaluation unit is operative to divide the image frames into disjoint subregions and to compute low-resolution transition values by selecting maximum values of the transition values in the subregions. Furthermore, the evaluation unit is operative to store the low-resolution transition values in the buffer for a predetermined number of image frames and to use the low-resolution transition values to compute the corresponding expectation values and the corresponding satisfied transition values.

According to yet a further embodiment, the evaluation unit is operative to receive and process movement data from a vehicle speed sensor and from a steering angle sensor.

According to yet a further embodiment, the evaluation unit is operative to receive and to process movement data at least one camera sensor, such as a camera sensor of a surround camera system.

According to a further embodiment, the evaluation unit is operative to assign motion vectors to the pixels of the image frames according to a simplified model of a surrounding scene, the simplified model comprising a horizontal ground surface, a first region of vertical objects and a second region of vertical objects.

According to yet a further embodiment, the evaluation unit is operative to identify sets of nearby frames for which the vehicle is moving essentially in a straight line, within a predetermined margin, and to update the accumulated expectation value and the accumulated satisfied transition value for the identified frames only.

According to a further aspect, the present specification discloses a kit with the aforementioned evaluation unit and at least one vehicle camera. The vehicle camera is connectable to the evaluation unit, directly via a dedicated cable or indirectly via an automotive data bus. The kit may furthermore comprise a data transmission cable, the camera and the evaluation unit are adapted for a data transmission from the camera to the evaluation unit, for example by providing a pre-defined data exchange protocol on both devices.

In a further aspect, the present application discloses a vehicle with the aforementioned kit, in which the evaluation unit is connected to an automotive data bus of the vehicle, at least one camera is mounted to the vehicle, and at least one camera is connected to the evaluation unit.

BRIEF DESCRIPTION OF THE DRAWINGS

The subject matter of the present application is now explained with respect to the following Figures in which.

DETAILED DESCRIPTION

In the following description, details are provided to describe the embodiments of the present specification. It shall be apparent to one skilled in the art, however, that the embodiments may be practiced without such details.

Figure 1:
FIG. 1 shows a lens image of a soiled lens.
Figure 2:
FIG. 2 shows a lens image of a wet lens.
Figure 3:
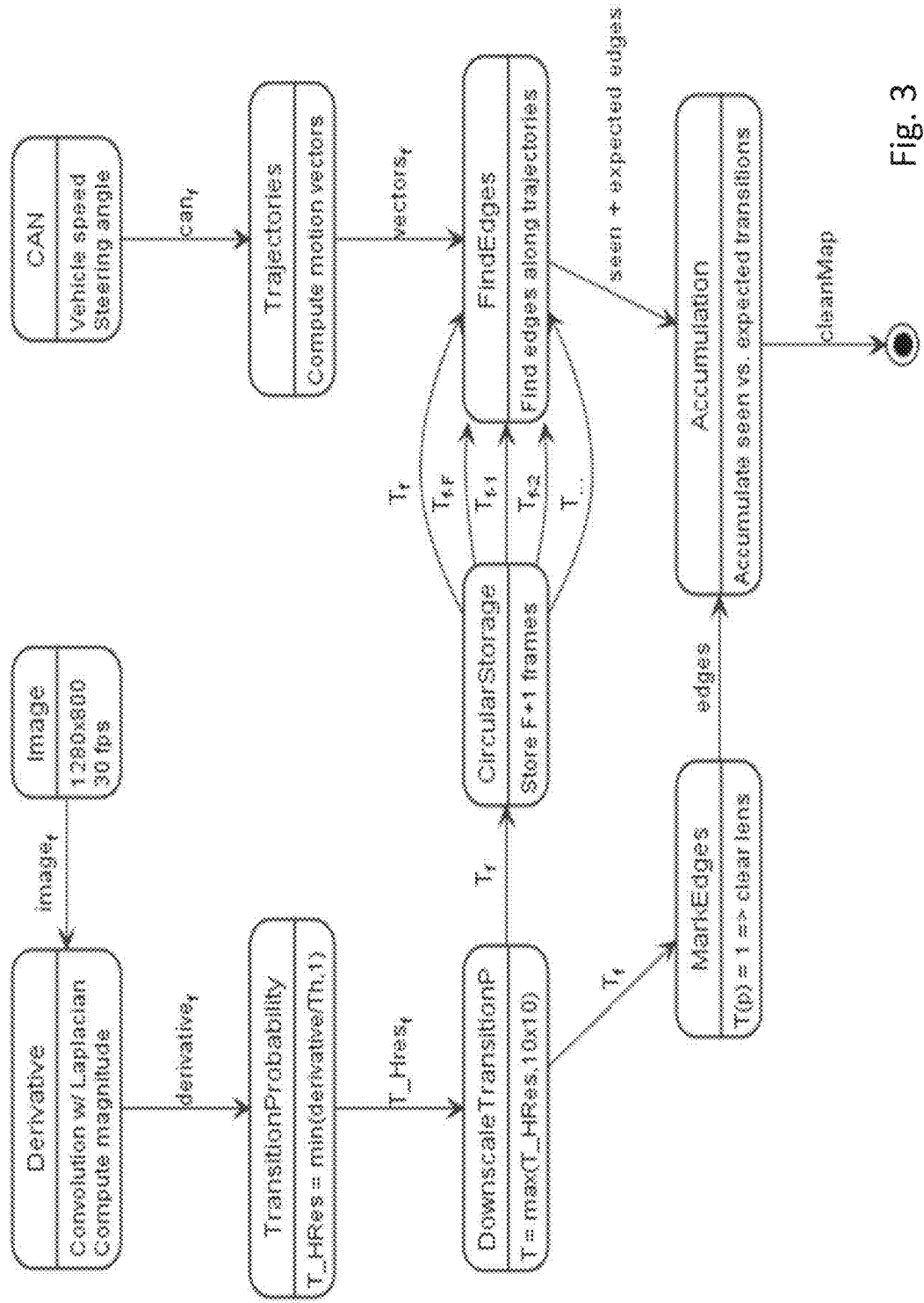
FIG. 3 shows a flow diagram of a method according to the present application.

A common assumption in imaging systems is that the radiance emitted from a scene is observed directly at the sensor. However, there are often physical layers or media lying between the scene and the imaging system. For example, the lenses of vehicle cameras, consumer digital cameras, or the front windows of security cameras often accumulate various types of contaminants over time such as water, fingerprints, dust and dirt. Artifacts from a dirty camera are shown in FIGS. 1 and 2.

These artifacts can be disturbing for users but more importantly, can seriously impair the analysis of the scene by automatic methods. For example, in the automotive area, the wrong analysis of a scene may lead to the malfunction of security system when they are needed in case of an accident, false alarms, or unwanted action from the vehicle like an erroneous automatic break action. These artifacts may potentially cause potentially life-threatening situations.

Because many camera systems are automated and are not often inspected, an automatic way of detecting such artifacts is needed. A method that detects that there are issues on the lens can order the lens to be cleaned, notify a human that it needs attention or disable or notify the methods that follow that that particular part of the image is not usable.

There are few methods in the literature that deal with this issue. The method disclosed in "Removing Image Artifacts Due to Dirty Camera Lenses and Thin Occluders", by J. Gu, R. Ramamoorthi, P. N. Belhumeur and S. K. Nayar, in ACM Transactions on Graphics (Proceedings of SIGGRAPH Asia), December 2009, attempts to detect and correct the artifacts in image sequences but needs that the output of computing the mean image and mean image derivative magnitude over time are mostly constant valued image-sized arrays except where artifacts are located (see FIG. 6 b) and c) in the aforementioned paper). This means that these quantities are only usable after a very large amount of frames, i.e., a long time, and that the scenes have to be totally uncorrelated.

While the first condition imposes a long detection time, the latter one is typically not applicable at all, since the scenes in most real-life scenarios have always about the same type of content, e.g., a road below and sky above for automotive applications. The authors themselves recognize that lighting is typically correlated and propose a solution with inferior quality.

The method in the reference "Removal of Image Artifacts Due to Sensor Dust" by C. Zhou and S. Lin, Association for Computing Machinery, Inc., June 2007, reduces the appearance of dust in an image by first formulating a model of artifact formation due to sensor dust and then using contextual information in the image and a color consistency constraint. This method has a very narrow application range, i.e., the detection of dust particles, and minimizes a non-convex function using a computationally intensive and often instable method.

Finally, because the media obstructing the visual path is located at the lens, it either obstructs light completely, as shown in FIG. 1, or it makes the information very blurry in the soiled regions. The latter occurs because the media is not in focus and also because elements like water droplets have a magnifying effect, as shown in FIG. 2. An approach which detects blurred regions works best if the entire image or very large portions of it are being considered, since it is very unlikely that an image taken from a realistic environment is blurred everywhere.

Such an approach does not work well for small regions because, although a soiled region implies very often that the region is blurred, a blurred region does not imply that it is soiled. The image can contain blurred regions simply because there is no texture on the scene at that location. That would be the case of an image of a white featureless wall, the door of a vehicle, a clear sky, etc. So, there is an ambiguity in knowing whether a blurred/texture-less region in the image is caused by lack of texture in the scene or soiling on the lens. This ambiguity is solved by the proposed method.

By using an artifact detection method according to the present specification this ambiguity can be reduced or even resolved. According to the artifact detection method, areas with sharp edges can be marked as artifact free. This step is based on the consideration that a sharp edge on the image indicates that the lens is not soiled in that location.

According to a key aspect of the artifact detection method, a known movement of the vehicle is used to derive a trajectory of an edge point and to check if the edge point is observed at an expected location of the image. If an edge point is not detected at some location along its expected trajectory, the location corresponds to a location of the lens that is soiled and is marked as an artifact.

In a first step, the magnitude of derivatives, E, in the image, I, is computed for every frame. In particular, the derivative E can be obtained by a convolution with a filter that approximates a derivative. Absolute maximum and minimum values of the second derivative have been found particularly useful for edge detection. The sum of the second derivatives in all spatial directions is also referred to as a "Laplace operator".

According to the present method, the direction of the derivative can be disregarded and, therefore, a simple isotropic Laplacian filter can be used, $$F = \begin{bmatrix} 1 & 1 & 1 \\ 1 & -8 & 1 \\ 1 & 1 & 1 \end{bmatrix}. \tag{1}$$

This approximation is isotropic, i.e., puts equal weight on vertical, horizontal and diagonal derivatives. Other approximations of the two-dimensional Laplace operator can also be used, such as $$F = (1-\gamma)\begin{bmatrix} 0 & 1 & 0 \\ 1 & -4 & 1 \\ 0 & 1 & 0 \end{bmatrix} + \gamma \begin{bmatrix} 0.5 & 0 & 0.5 \\ 0 & -2 & 0 \\ 0.5 & 0 & 0.5 \end{bmatrix},$$

wherein $\gamma$ is between 0 and 1. The derivative E is then computed as $$E = |I * F|, \tag{2}$$

wherein I*F stands for a two-dimensional convolution of the filter with the pixel values and "|| ||" stand for a magnitude such as the L2 norm. The pixel values I(x, y) represent an intensity, such as a grey scale intensity, an intensity in a color channel or also an effective intensity of multiple color channels.

In terms of pixel coordinates x, y the discrete two-dimensional convolution can be written out as $$G[x, y] = \sum_{u=-k}^{k} \sum_{v=-k}^{k} F[u, v] I[x - u, y - v],$$

wherein k=1 for the abovementioned filter and wherein the coordinate (−1, −1) corresponds to the upper left corner of the matrix F.

Instead of a Laplace filter, other derivative operators such as the Sobel or Prewitt derivative operators can be used to identify changes within the images.

The values along the borders of the image frame can be computed by imposing special conditions, for example by creating an outer frame, wherein the pixels have the same or similar values as the outer pixels or zero values. According to another embodiment, the convolution is only computed for the inner pixels of the image frame.

The method can be further simplified in that the actual value of the derivative is disregarded. Instead, the occurrence of a transition is computed. In particular, a probability of finding a transition is computed as the normalized minimum between a detection threshold, ThEdge, and the derivative values, E, $$T_{HRes} = \min\left(1, \frac{E}{ThEdge}\right). \quad (3)$$

The detection threshold ThEdge is chosen sufficiently high, such that only the clearly visible transitions are detected.

According to a further aspect of the present method, a lower resolution version of $T_{HRes}$ is computed, wherein each pixel corresponds to non-overlapping N×N pixels of the original resolution. By way of example, N×N can be chosen as 20×20 pixels. By using the lower resolution version, the computational load can be decreased and a constraint of high precision point trajectories can be removed.

A low resolution probability of detecting transitions in the image is computed as $$T(x_0, y_0) = \max\{T_{HRes}(x, y) : (x, y) \in \dot{U}(x_0, y_0)\}, \quad (4)$$

wherein each region $\dot{U}(x_0, y_0)$ contains N×N pixels. The low resolution probability is assigned to all pixels of the subregion. The pixels of the subregion correspond to an effective "N×N pixel" $(x_0, y_0)$, which is stored as a single low-resolution pixel in computer memory.

For example, a 1280×800 image frame can be divided into non-overlapping or disjoint quadratic subregions with sizes 10×10, 16×16, 20×20 or 40×40. According to other partitions there may also be regions $\dot{U}(x_0, y_0)$ with different sizes. This may be the case if an image frame cannot be subdivided into N×N regions without remainder. Furthermore, the subregions may also comprise rectangular subregions, in particular near the boundary of the image frame.

In order to analyze the trajectories over time, the probabilities of detecting a transition for a few frames is stored in a computer memory. A method of determining the number of frames to be stored is described further below.

If there is a high probability for a transition at point $(x_0, y_0)$ in frame f, the point is likely in a clean region of the lens. In this case, the transition point will be visible along its natural trajectory in the next frames unless the lens is soiled.

The conditional probability that the lens is clean in a point (x, y) along the trajectory of a transition point is represented as the conditional probability of finding a transition in that trajectory in a nearby frame with a frame index f̂, under the condition that a transition was detected at point $(x_0, y_0)$. In mathematical terminology, this conditional probability is defined as:

$$C_f(x,y) = p(\exists_{\hat{f} \in [f+1, f+F]} T_{\hat{f}}(x,y) | T_f(x_0, y_0)). \quad (5)$$

In other words, the right hand side refers to the probability that there exists at least one frame, with index in [f+1, f+F], such that it has a transition T(x, y) for this frame index, under the condition that the transition in point $(x_0, y_0)$ has value $T(x_0, y_0)$, and under the condition that (x, y) is a point on an estimated transition point trajectory starting in $(x_0, y_0)$. The transition values T can have any value between 0 and 1.

By applying Bayes law and using the previously defined approximation to the probability T(x, y), the conditional probability can be computed as $$C_f(x, y) = \qquad (6)$$
$$\frac{p(\exists_{\hat{f} \in [f+1, f+F]} T_{\hat{f}}(x, y))}{T_f(x_0, y_0)} = \frac{\max\{T_{\hat{f}}(x, y) : \hat{f} \in [f + 1, f + F]\}}{T_f(x_0, y_0)}.$$

Similarly, given some probability that there is a transition at point $(x_0, y_0)$ in frame f, it can be expected that this transition point is visible along a given trajectory in the previous frames as well. If f refers to the present frame, then only previous frames are available.

Choosing a range of frames, in this case the frames between the index f+1 and f+F, takes into account that the velocity estimate is not absolutely accurate and the velocity may change and therefore the time at which the transition will pass over the pixel (x, y) is not known exactly.

In general, the exact trajectory of the transition points in the frames is only known exactly if the three-dimensional coordinate of the points and the camera motion are known. For this reason, a set of approximations is used that makes this problem tractable. Firstly, by using low resolution transition probability arrays, vectors with large deviations from the assumed one often correspond to the same low resolution point, thus reducing the demand for high motion vector accuracy.

Secondly, $C_f(x, y)$ is computed for frames in which the vehicle is moving in an approximate straight line. Thereby, the trajectory estimation is made simpler. The motion of the vehicle can be determined by using CAN data and the vehicle speed. This situation occurs most of the times and will in general lead to a valid approximation. However, all other motions are also possible.

According to a third approximation, only those points are considered which are located on the floor, on a left vertical plane, or on a right vertical plane at a given constant distance from the vehicle. These last two approximations enable the computation of approximate motion vectors, whose direction is essentially correct and which have only a small error in their size.

Figure 4:
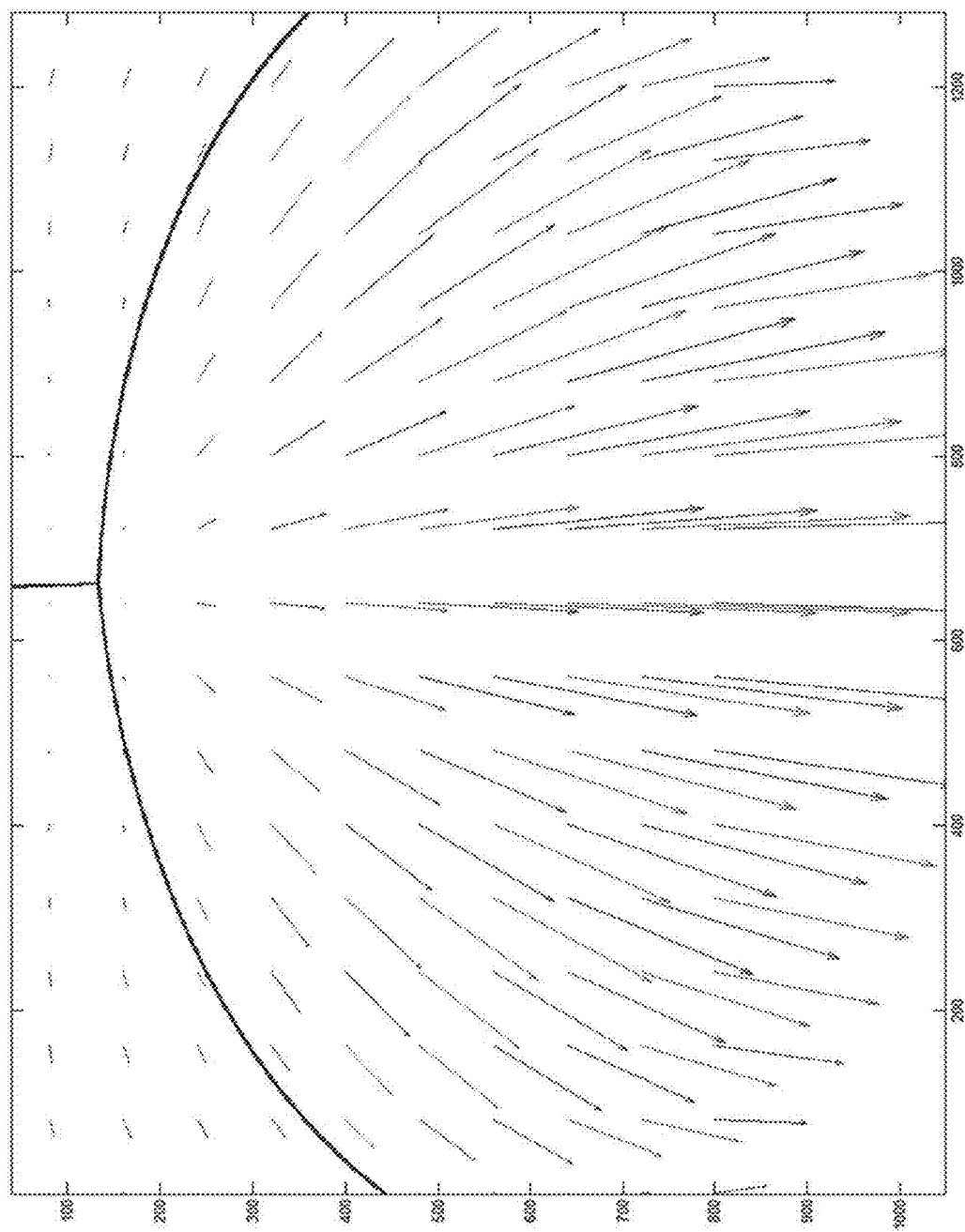
FIG. 4 shows a simplified scene with camera motion vectors.

FIG. 4 illustrates an estimated three-dimensional surface and vectors obtained from it. The scenario of FIG. 4 is such that the image processing system estimates a forward motion. FIG. 4 shows that some vectors are approximately zero. Since no trajectory is created in these regions, it is not possible to estimate soiling of the lens there. However, they occur mostly in sky regions when the vehicle has forward motion and, therefore, are not so important. To determine soiling in all areas of the lens, other types of motion, such as curving to the left or right, are needed.

According to the model of FIG. 4, the scene is subdivided into a first region, which corresponds to the ground surface, a second region, which is left to a fixed point of the motion and a right region, which is right the fixed point. In the left and right region, the objects are assumed to have vertical orientation.

An artifact detection according to the present specification is improved when the overall probability $C(x, y)$ of the lens being clean is obtained over time and with a lot of accumulated evidence. Let a transition request be the expectation that is created in point $(x, y)$ from the fact that a transition was detected in point $(x_0, y_0)$ in a nearby frame.

In this scenario, $C(x, y)$ can be computed as the ratio between the number of transition requests that are satisfied, $Sat(x, y)$, and the total amount of transition requests, $Tot(x, y)$, for that pixel. $Tot(x, y)$ and $Sat(x, y)$ are probabilities and may also be regarded as relative numbers of transition requests.

For each pixel $(x, y)$ and each frame $f$, the following values are computed:

If it is determined that the probability of a transition is 1, or in other words, that $T_f(x_0, y_0)=1$, it can be assumed that the lenses are clean in those pixels. For these pixels, the quantities $$Sat_1(x_0,y_0)=Sat(x_0,y_0)(1-upEdge)+upEdge$$

$$Tot_1(x_0,y_0)=Tot(x_0,y_0)(1-upEdge)+upEdge \qquad (7)$$

are computed, where upEdge is an Infinite Impulse Response (IIR) update constant with a large value. A value of upEdge=0.5 is used to obtain the FIGS. 5 to 16 according to the experimental data. If $T_f(x_0, y_0)<1$, the quantities are set to zero, $Sat_1(x, y)=Tot_1(x, y)=0$, wherein $(x_0, y_0)$ is equal to the pixel location $(x, y)$.

The arrays $Sat(x, y)$ and $Tot(x, y)$, on the right hand side of the equations refer to the values before the update step. By convention, update equations, such as the equations (7) to (12), represent instructions to read values from computer memory, perform the computation on the right hand side of the equations and to store the resulting value in a memory area, which is represented by the left hand side of the equation.

The arrays $Sat(x, y)$ and $Tot(x, y)$ are initialized with zero values, so if $Sat(x_0, y_0)$ and $Tot(x_0, y_0)$ had not been updated previously the left hand values of equation (7) are equal to the constant "upEdge".

The quantities $Sat(x, y)$ and $Tot(x, y)$ are updated at coordinates $(x, y)$ along the trajectory of a point $(x_0, y_0)$ for which $0<T(x_0, y_0)<1$, to reflect how much of the transition detected in $(x_0, y_0)$ is visible in a nearby frame at point $(x, y)$. The amount by which these quantities are updated is proportional to the value of $T(x_0, y_0)$. Thus, a strong transition creates a strong expectation and a large update and a weak transition creates a weak expectation and a small update.

The update equation is applied two times in order to detect if transitions of a frame f–F in the past are detected in the subsequent frames [f–F+1, f], a according to $$Sat_2(x,y)=Sat(x,y)(1-upTraj\cdot T_{f\text{-}F}(x_0,y_0))+ \\ upTraj\cdot min\{T_{f\text{-}F}(x_0,y_0),max\{T_j(x,y):j\in[f\text{-}F+1,f]\}\}$$

$$Tot_2(x,y)=Tot(x,y)(1-upTraj\cdot T_{f\text{-}F}(x_0,y_0))+upTraj\cdot T_{f\text{-}F}(x_0,y_0) \qquad (8)$$

and in order to detect if transitions in the current frame f were detected in the previous frames [f–F, f–1], according to $$Sat_3(x,y)=Sat(x,y)(1-upTraj\cdot T_f(x_0,y_0))+upTraj\cdot min\{T_f(x_0,y_0),max\{T_j(x,y):j\in[f\text{-}F,f\text{-}1]\}\}$$

$$Tot_3(x,y)=Tot(x,y)(1-upTraj\cdot T_f(x_0,y_0))+upTraj\cdot T_f(x_0,y_0) \qquad (9)$$

where upTraj is set to a small value. A value of upTraj=0.05 was used to obtain the pictures 5 to 16 according to experimental data. If $T_f(x_0, y_0)=0$ or 1, then the quantities $Sat_3$ and $Tot_3$ are set to zero, $Sat_3(x, y)=Tot_3(x, y)=0$. Similarly, if $T_{f\text{-}F}(x_0, y_0)=0$ or 1, then the quantities $Sat_2$ and $Tot_2$ are set to zero, $Sat_2(x, y)=Tot_2(x, y)=0$.

The effective arrays Sat and Tot at each frame are then computed as the maximum of these quantities. Thus, for each pixel, $$Sat(x,y)=max\{Sat_1(x,y),Sat_2(x,y),Sat_3(x,y)\}$$

$$Tot(x,y)=max\{Tot_1(x,y),Tot_2(x,y),Tot_3(x,y)\}, \qquad (10)$$

This computation is followed by a slight reduction step to enable change over time, $$Sat(x,y)=Sat(x,y)(1-upTime)$$

$$Tot(x,y)=Tot(x,y)(1-upTime) \qquad (11)$$

where upTime is a very small value, upTime <<1. A value of upTime=0.001 was used to obtain the experimental results of FIGS. 5 to 16. A final probability that the lens is clean at a particular point is then computed by $$C(x, y) = \frac{Sat(x, y)}{Tot(x, y)} \qquad (12)$$

By representing the amount of transitions that were expected at point $(x, y)$, the value of $Tot(x, y)$ provides a measure of confidence for the value of $C(x, y)$. Smaller values of $Tot(x, y)$ indicate that few transitions were expected in that pixel and that a large importance is being given to the few observations that were made. Larger values of $Tot(x, y)$ imply that $C(x, y)$ is the result of a large set of accumulated data and, therefore, has a higher probability of being correct. This is in turn indicates a higher probability that the value is not affected by the abovementioned simplifying assumptions.

It is therefore recommended that the value of $C(x, y)$ is only taken into account if $Tot(x, y)$ is very close to 1. In the experimental results of FIGS. 5 to 16, $C(x, y)$ was only considered for points in which $Tot(x, y)>0.95$.

The number of frames F to use and store are the result of a compromise. On the one hand, F should be as large as possible, to enable the detection of very large blurry areas: the more frames F are used, the longer is the expected trajectory and deeper it can go into blurry areas.

On the other hand, storing many transition arrays uses up memory even though the transition arrays have low resolution. Furthermore, as the actual motion may change over time, choosing a larger value of F increases the differences between the actual motion vectors and the assumed ones.

In the experimental results of FIGS. 5 to 16, the predetermined constant F is set to F=10 stored frames. This means that a total of 11 frames are used. At a frame rate of 30 frames/sec this corresponds to 0.37 seconds, by which time the car has moved about 5.14 m, if it moves at a speed of 50 km/h.

FIG. 4 illustrates a method for detection of a lens contamination according to the present specification. In a first step 20, image frames of size 1280×800 pixels are received from a vehicle camera, which operates at a frame rate of 30 frames per second.

In a second step 21, a magnitude of a derivative is computed for the pixels of the image frames by computing the two-dimensional convolution of a filter that approximates a Laplacian operator.

In a third step 23, a transition probability is computed as the minimum of the derivative magnitude divided by a transition threshold "Th" and the value 1. The transition probability can also be regarded as the probability that the pixel corresponds to a feature point, such as an edge.

In a fourth step 24, the image frame is subdivided into disjunct 20×20 subregions and a low resolution transition probability of a 20×20 subregion is computed as the maximum of the previously computed transition probabilities over the respective 20×20 subregion. The low resolution probability is assigned to an effective pixel.

In a fifth step 25, pixels having a low resolution probability of 1 are marked as clear. In a sixth step 26, the set of low resolution transition values for F+1 consecutive image frames, which has been computed in the previous step 24 is stored in a circular buffer.

In a seventh step 27, the vehicle speed and steering angle are received from a CAN bus and in an eight step 28, estimated motion vectors are computed using the vehicle speed and steering angle of step 27 and a simplified model of the exterior scene.

According to the simplified model, the motion vectors are computed for regions of the scene, which are assumed to be non-moving and to have horizontal or vertical orientation. In particular, the road surface and artificial structures along the road side provide corresponding objects.

In a ninth step 29, the low resolution transition values of the F+1 image frames in the circular buffer are used to find transitions along the estimated trajectories and to compare detected and expected transitions.

In a tenth step 30, the ratios of detected and expected transitions are accumulated, wherein the regions, which have already been marked as clean in the fifth step, are taken into account. The ratios are used in an eleventh step 31 to create a "cleanMap" which indicates locations of the lens which are clean, soiled or for which a contamination status cannot be derived with a sufficient certainty. In particular, the cleanMap can be represented by a memory area of a computer memory, which represents values that indicate which pixels correspond to clean areas of the lens and which pixels correspond to contaminated areas of the lens.

Experiments

Figure 5:
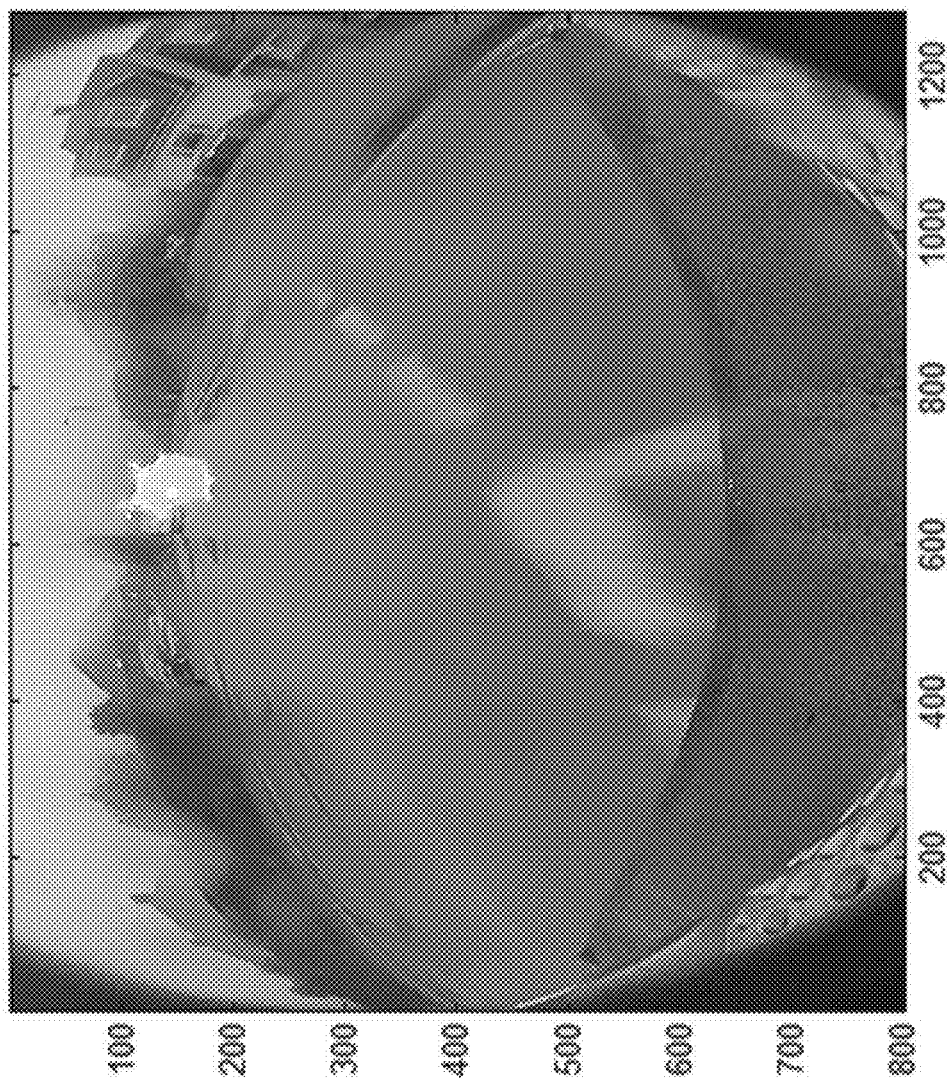
FIG. 5 shows a first camera with a first scene taken by a vehicle camera.
Figure 6:
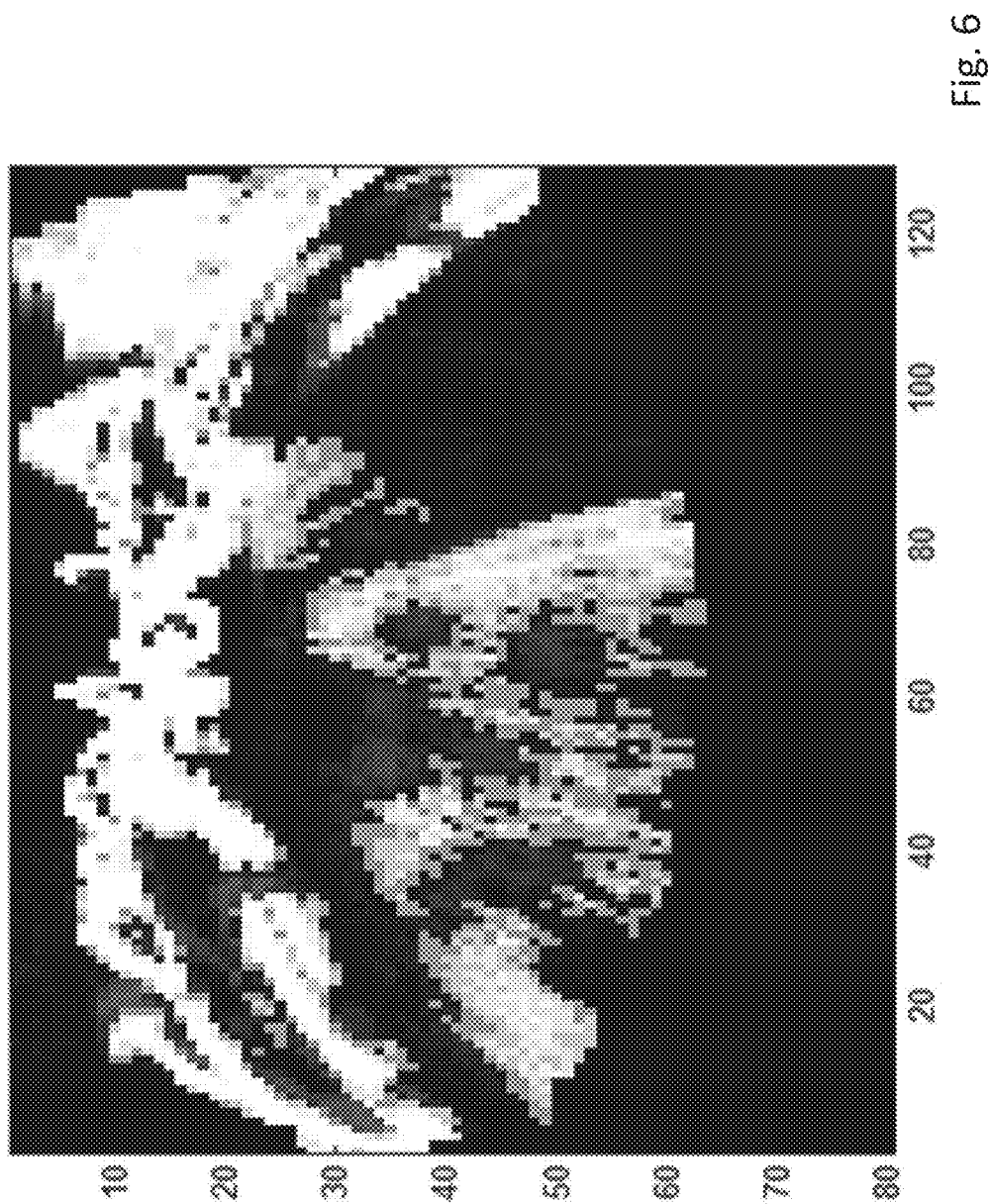
FIG. 6 shows a transition request diagram indicating a total number of transition requests per pixel for the scene of FIG. 5 after 10 frames.
Figure 7:
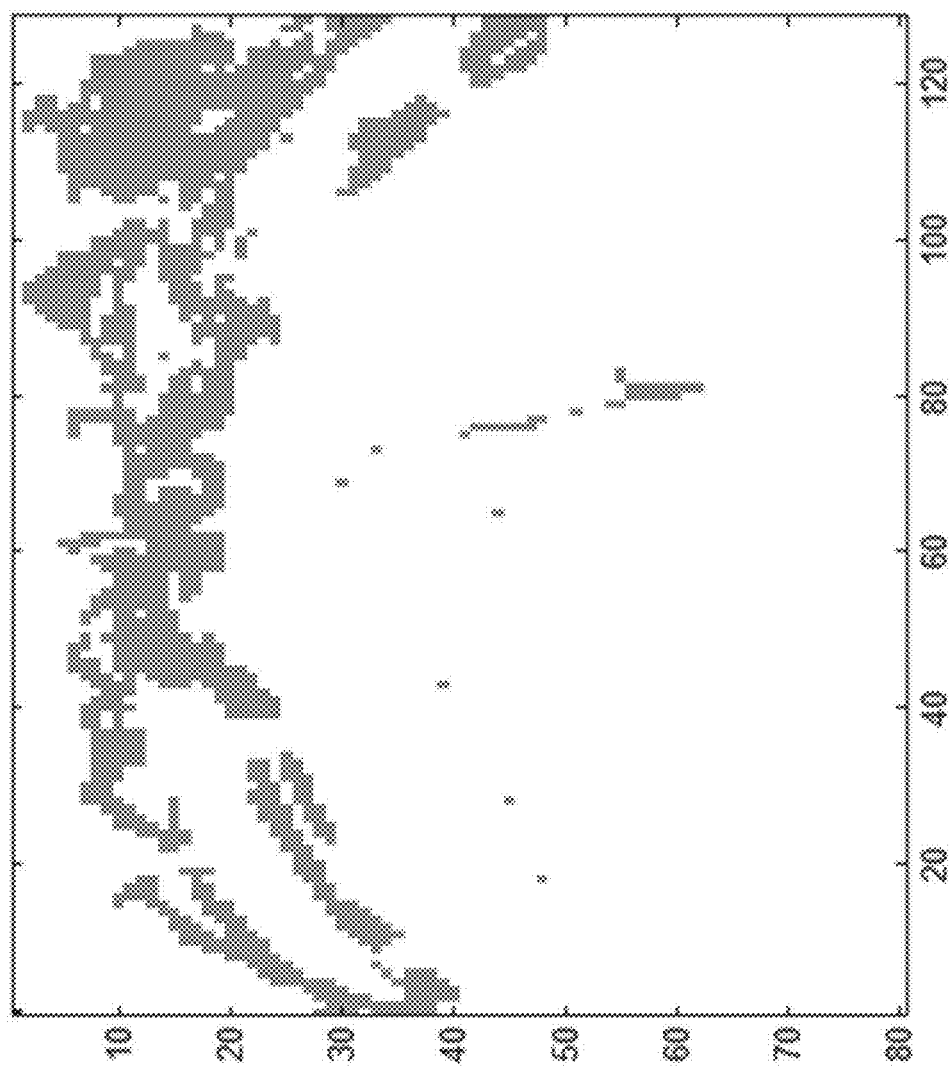
FIG. 7 shows a lens contamination diagram for the scene of FIG. 5 after 10 frames in which clean pixels are indicated.
Figure 8:
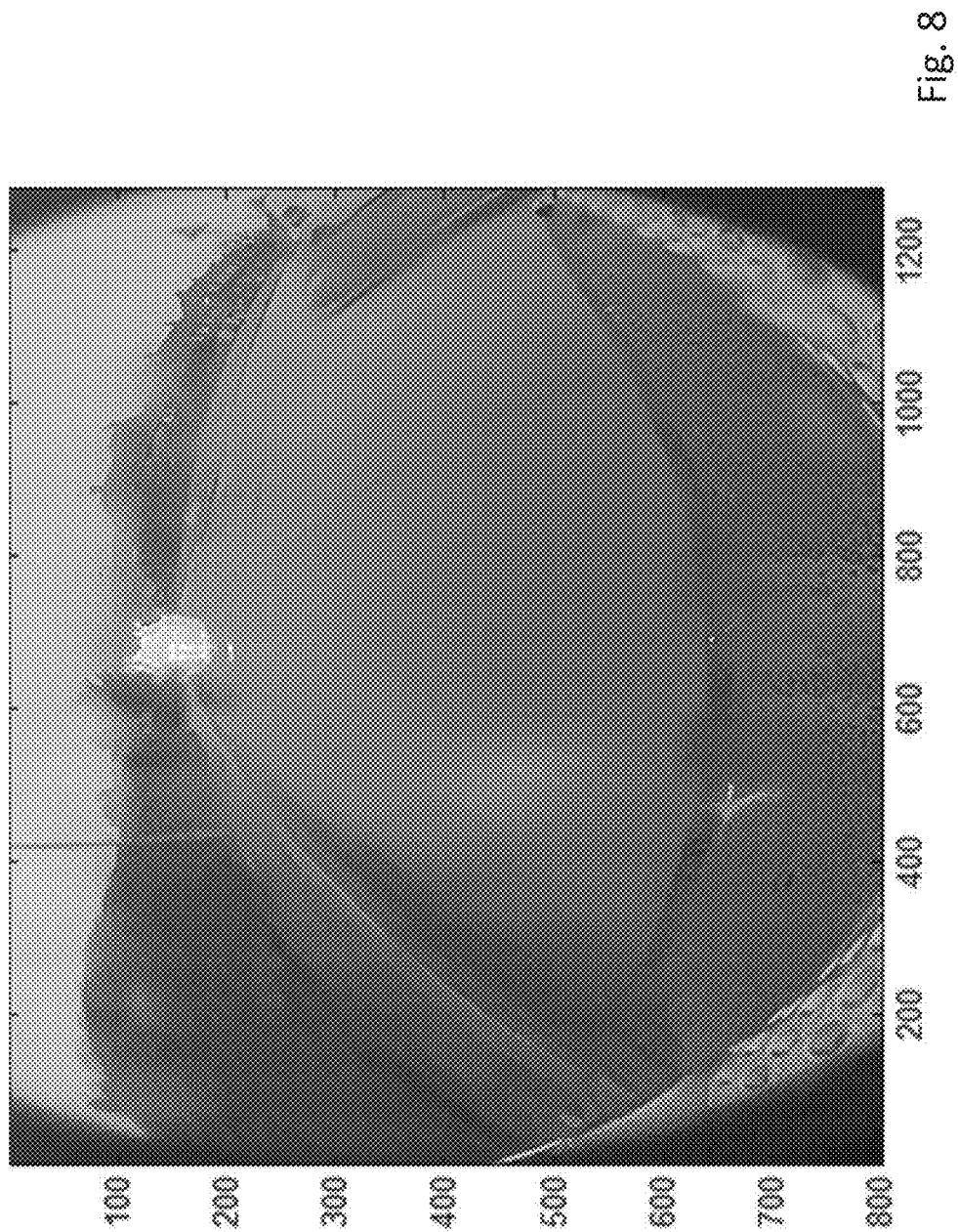
FIG. 8 shows a second camera image with a second scene taken by the vehicle camera of FIG. 5.
Figure 9:
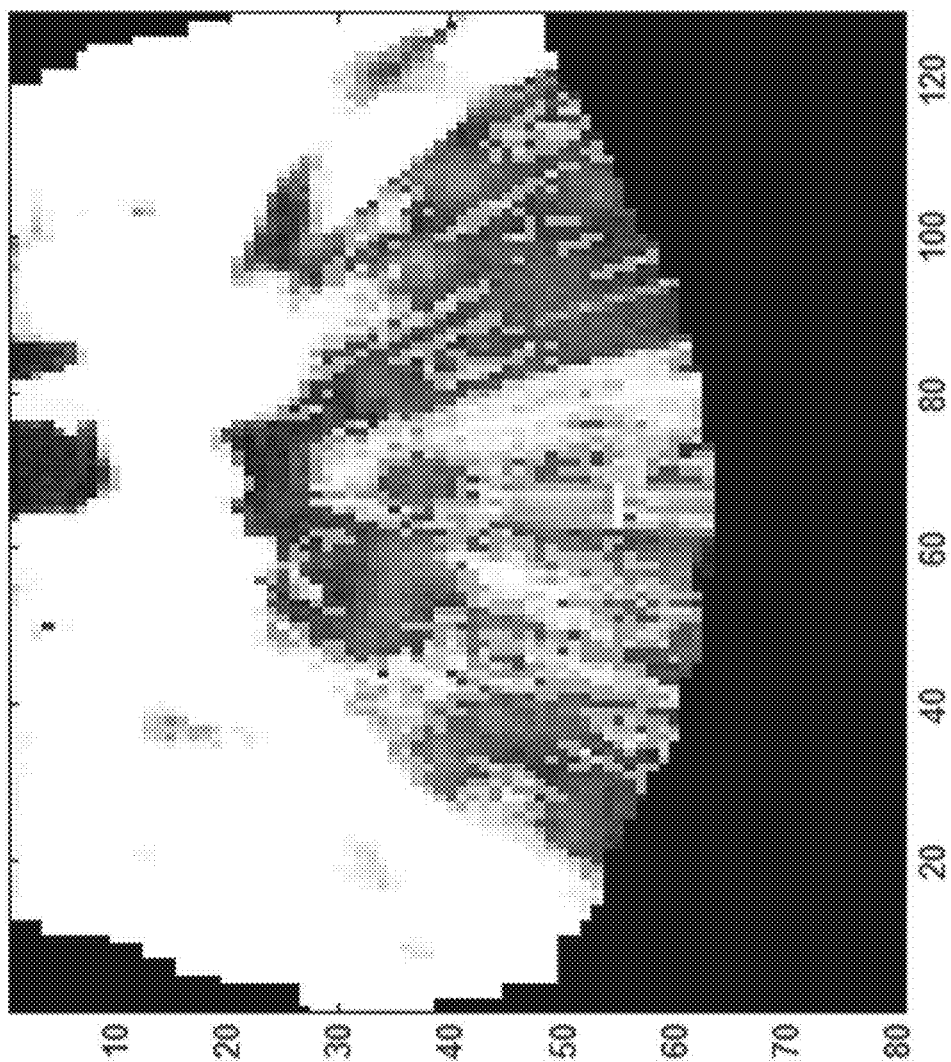
FIG. 9 shows a transition request diagram indicating a total number of transition requests per pixel for the scene of FIG. 8 after 200 frames.
Figure 10:
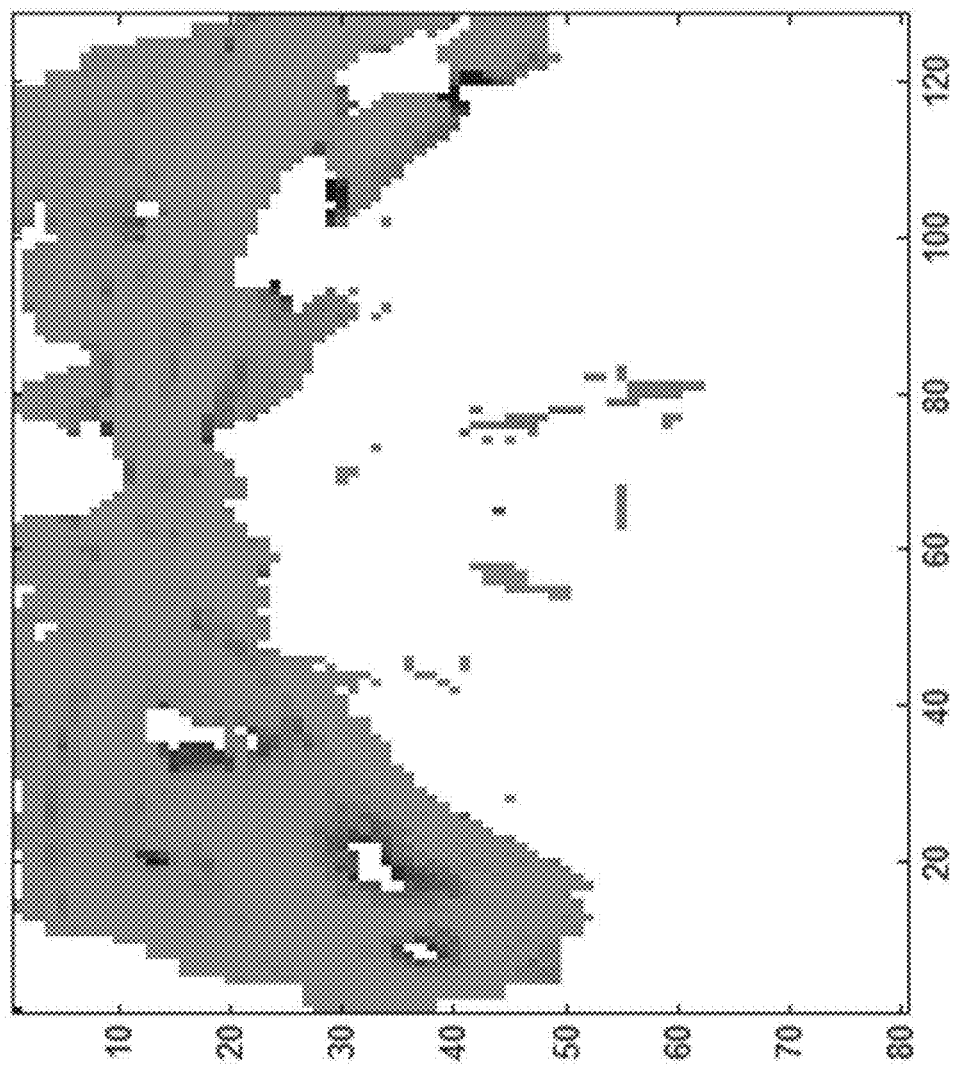
FIG. 10 shows a lens contamination diagram indicating for the scene of FIG. 8 after 200 frames in which clean pixels and artifact pixels are indicated.
Figure 11:
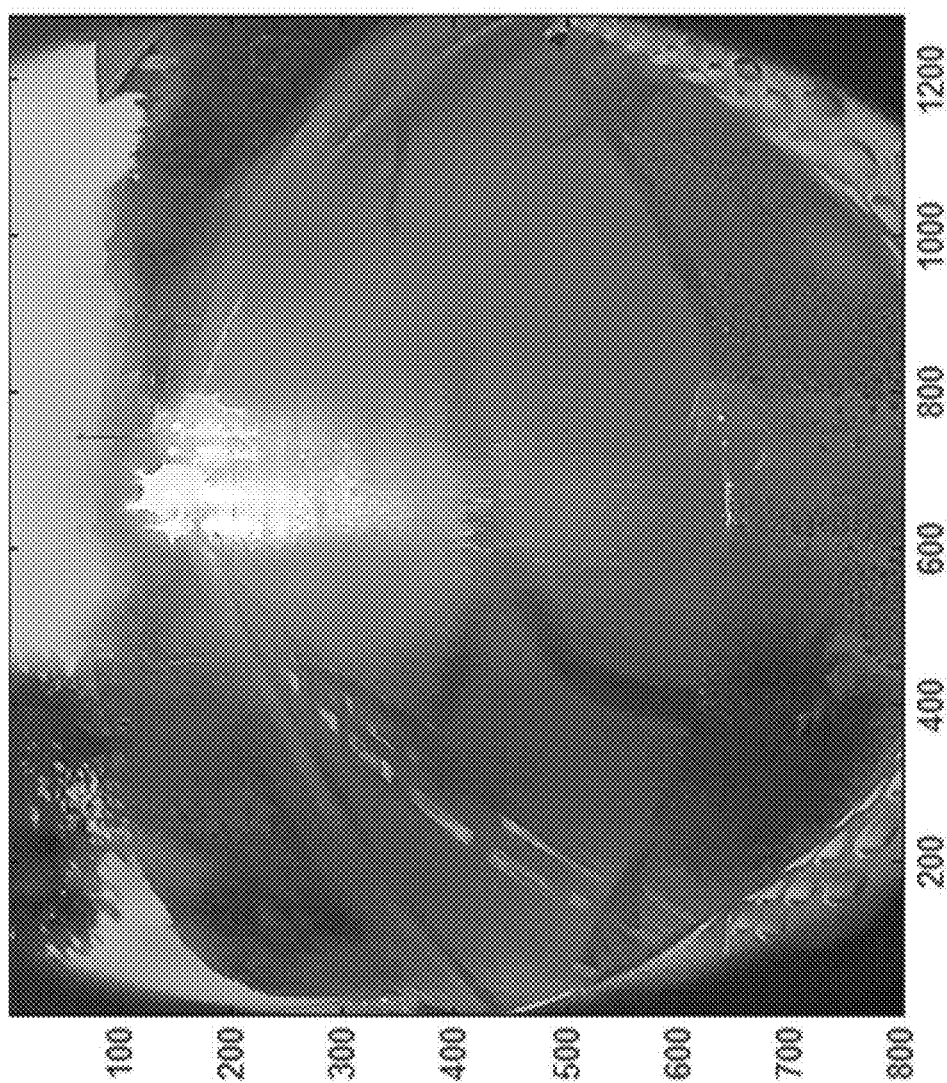
FIG. 11 shows a third camera image with a third scene taken by the vehicle camera of FIG. 5.
Figure 12:
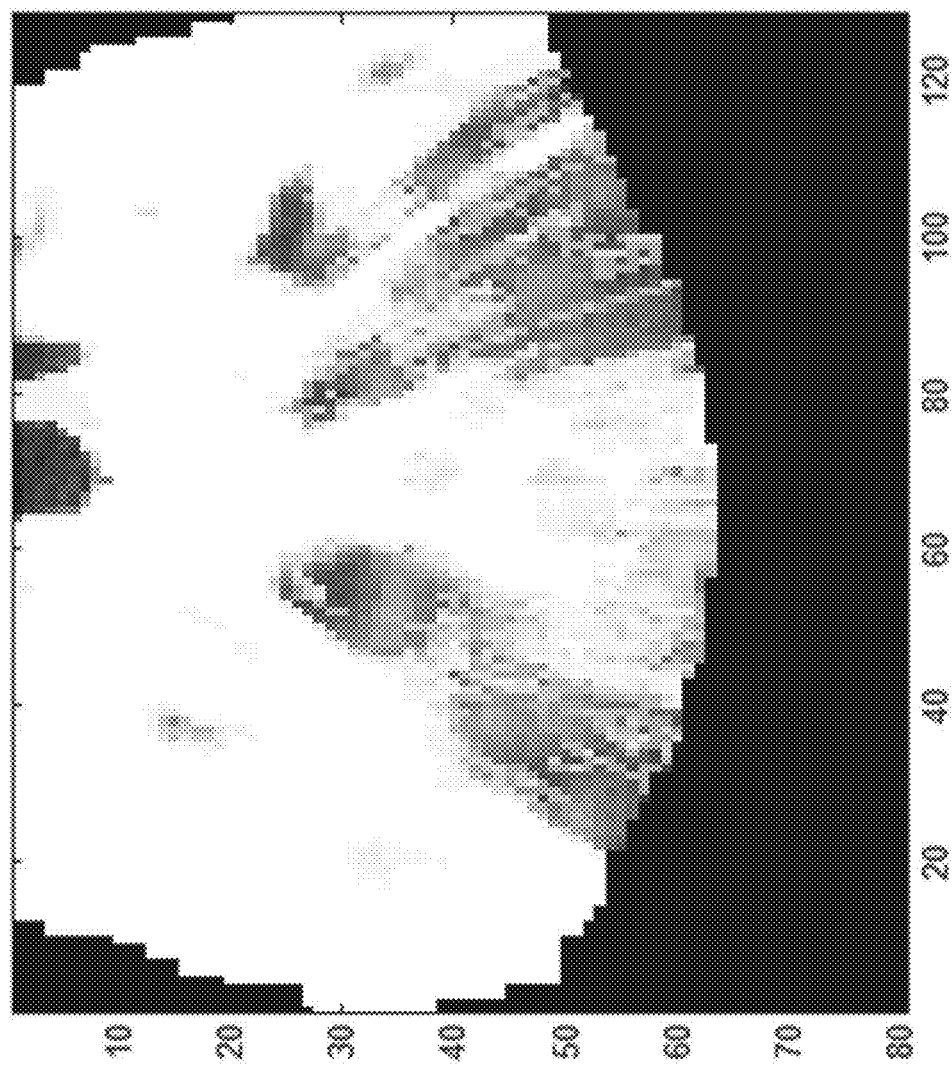
FIG. 12 shows a transition request diagram indicating a total number of transition requests per pixel for the scene of FIG. 11 after 400 frames.
Figure 13:
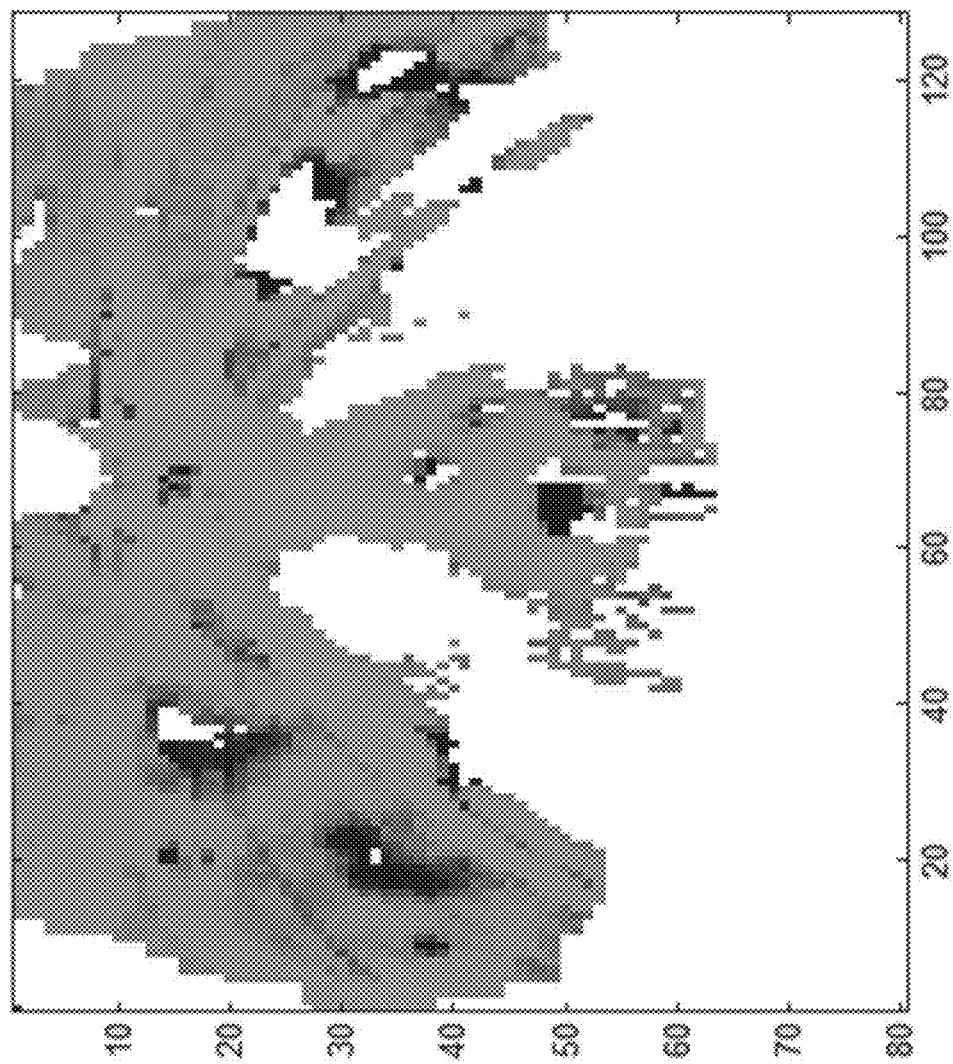
FIG. 13 shows a lens contamination diagram indicating for the scene of FIG. 11 after 400 frames in which clean pixels and artifact pixels are indicated.
Figure 14:
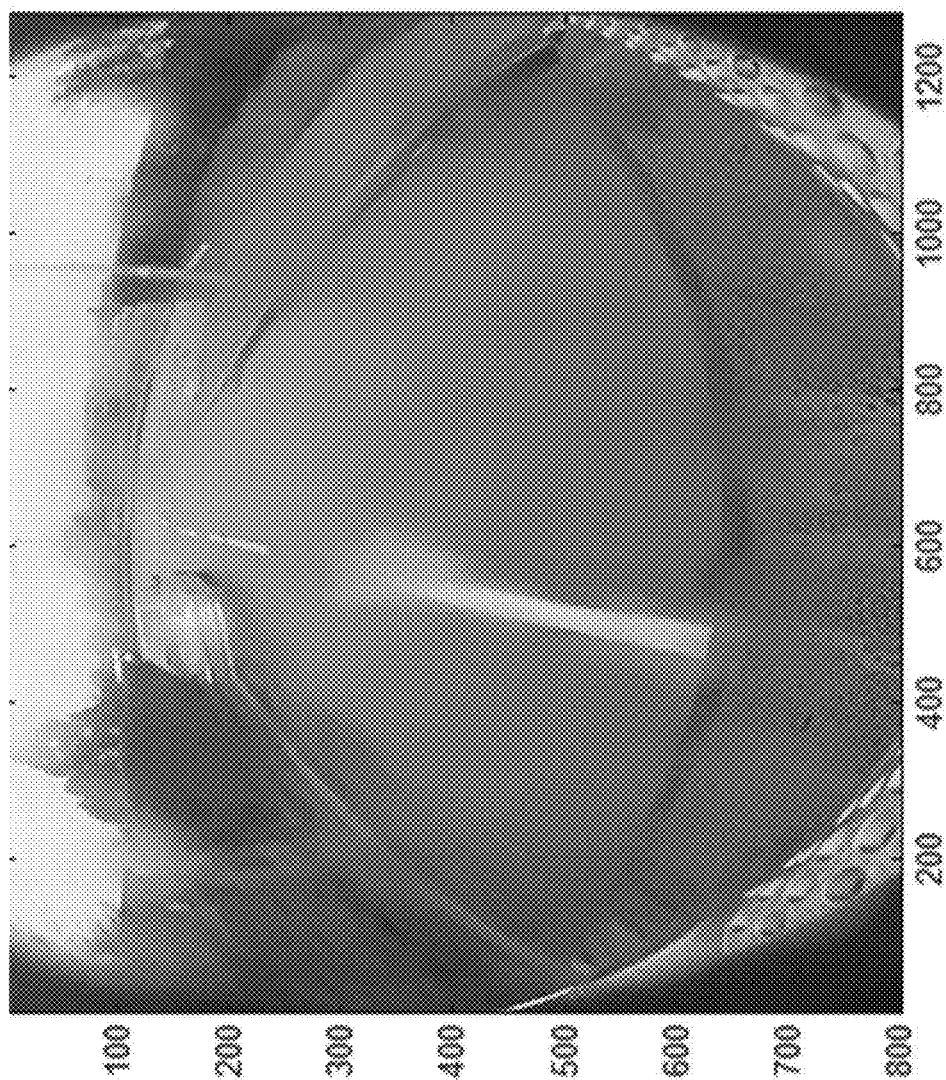
FIG. 14 shows a fourth camera image with a fourth scene taken by the vehicle camera of FIG. 5.
Figure 15:
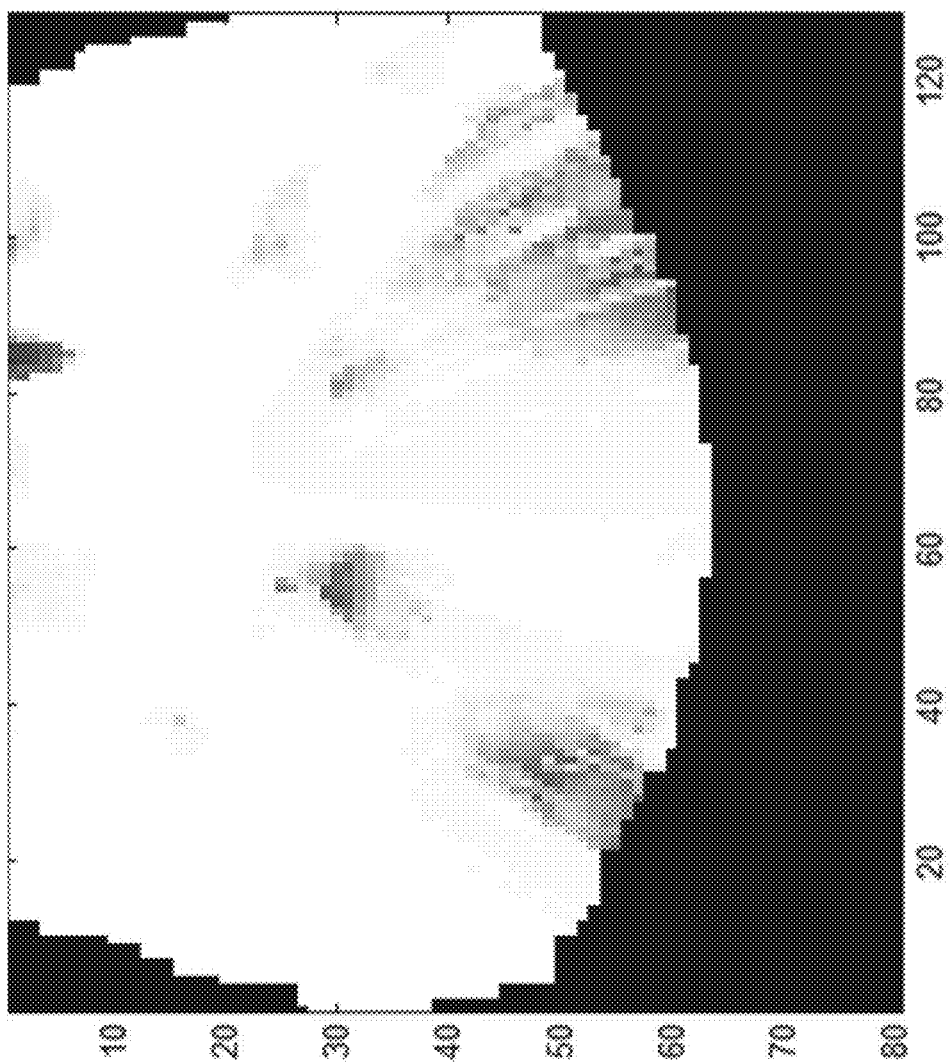
FIG. 15 shows an transition request diagram indicating a total number of transition requests per pixel for the scene of FIG. 14 after 700 frames.
Figure 16:
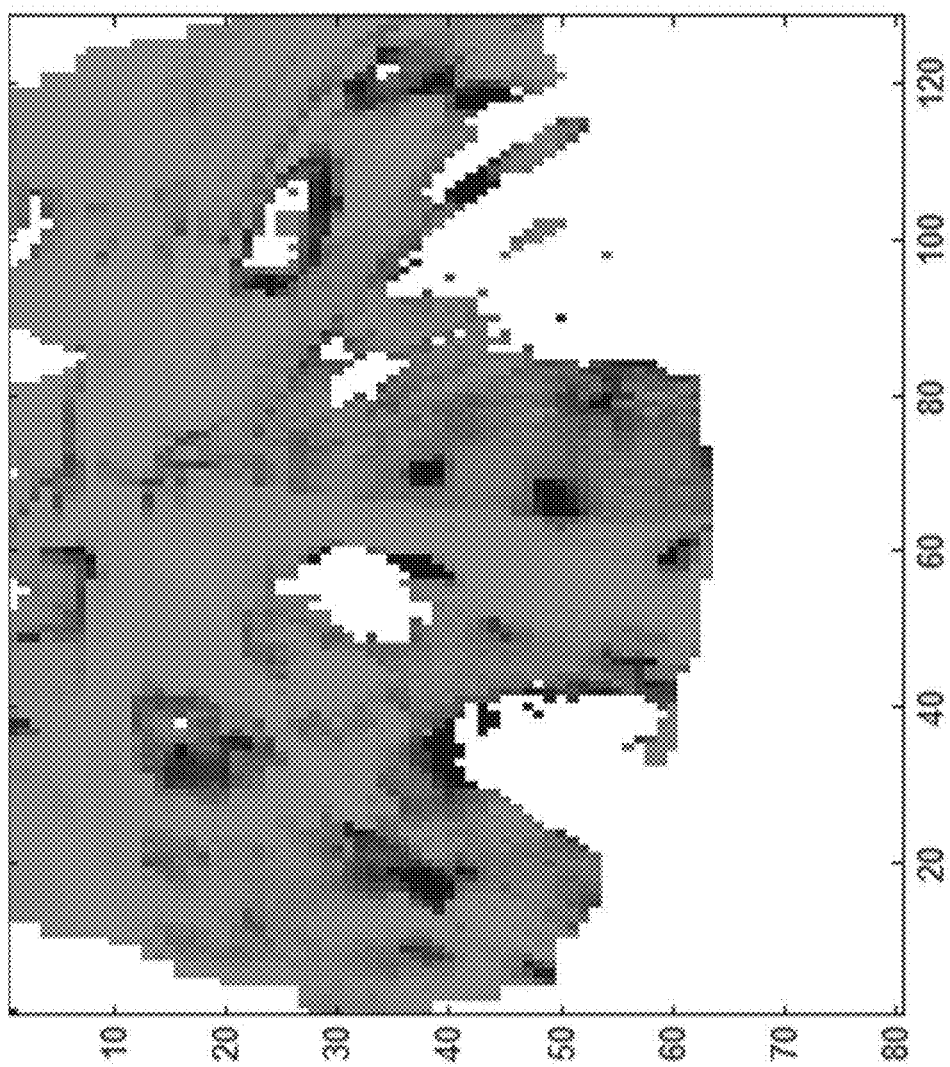
FIG. 16 shows a lens contamination diagram indicating for the scene of FIG. 14 after 700 frames in which clean pixels and artifact pixels are indicated.

The image series of FIGS. 5 to 7 shows the results of the artifact detection method after processing 10 frames of a sequence of the front camera using a surround view system, in which the lenses have drops of water. The second image, FIG. 6, shows the requests that were detected at those pixels, with brighter regions being originated mostly by strong transitions, since they have a high impact on this map. The third image, FIG. 7, shows an estimate of the state of the lens. In this scenario, the white pixels mean that there isn't enough data to confirm any scenario, which is equivalent to Tot(x, y)≤0.95 for the threshold of FIG. 7. The grey pixels indicate that the lens is clean at those pixels.

The image series of FIGS. 8 to 10, 11 to 13 and 14 to 16 show the evolution of the estimates, as more measurements are collected. The second images, FIGS. 9, 12 and 15 indicate that the amount of data that was expected for each pixel becomes progressively complete. At the same time, the third images, FIGS. 10, 13 and 16, converge towards the estimate of the state of the lens.

In these experiments, it takes a long time before a complete and credible estimate of the lens soiling is formed, due to the lack of texture caused by motion blur and the wet road. In simpler scenarios, where there is a lot of texture, the estimate can be formed in very few frames already. In other words, it is possible to obtain a good estimate in only one or two update steps or time accumulation steps.

CONCLUSION

The experimental results of FIGS. 5 to 16 demonstrate the effectiveness of a method in capturing the soiling status of the lens, both in locations that are densely populated with transitions and on locations that are not. Naturally, areas with little content take longer to detect.

According to a first embodiment, transitions are detected but not tracked. By not tracking transition points, the method results to be simple, yet powerful. In this context, a "tracking" comprises an explicit search or comparison to find out where a feature went on the subsequent frames. By contrast, the method according to the first embodiment is based on the assumption that the transitions will be detected somewhere along the expected trajectory. It does not require a confirmation that a transition at a point (x, y) actually corresponds to the transition that was detected at point (x0, y0). It could actually be a transition from some other point (x1, y1).

According to further embodiments, the accuracy of the method can be increased by tracking the detected transition with a matching method such as sum absolute difference (SAD), correlation, sum squared difference (SSD) or a scale invariant feature transform (SIFT). Thereby, a pixel location to which the transition has moved in a nearby frame can be predicted more accurately.

A more complex and less general second embodiment works in the following way:

Find feature points in an image, for example by using a Harris corner detector.

Determine the three-dimensional coordinate of that point using a standard structure for the motion. Preferentially, the standard structure for the motion is provided by static objects, which do not have an independent motion.

Use the estimated 3D coordinate of each feature point and the movement of the vehicle, which is provided for example by using CAN data or explicit ego-motion computation, a trajectory that each feature point exhibits in the images in the next frames is determined. Similarly, the same method can be applied to determine the trajectory exhibited in the images in the previous frames.

By using the trajectory of the point, the approach according the first embodiment can be applied directly: an expectation value is computed that each feature point will be detected along a trajectory. This expectation is not met in locations where the lens are soiled. By measuring the ratio between expectations that are met and the total expectations for each point, a location where the lenses are soiled can be detected.

According to a third embodiment the approach according to the second embodiment is applied to a stereo scenario:

Find feature points in an image using, for example, a Harris corner detector.

Determine the 3D coordinate of that point using stereo information.

Use the 3D coordinate of each feature point and the movement of the vehicle, which can be derived by using CAN data or explicit ego-motion computation, the trajectories of the feature points can be predicted for both of the stereo images in the next frames. The same approach can be applied to determine the trajectory exhibited in both images, in the previous frames.

By using the trajectories of the point, an expectation value is computed that each feature point will be detected along its respective trajectory and will not be met in locations where the lenses are soiled. By measuring the ratio between expectations that are met and the total expectations for each point, the locations of the lenses which are soiled can be inferred. These locations may in general be different for the left and right images of a stereo camera.

The invention claimed is:

1. A method for detecting contaminations on a lens of a vehicle camera, comprising:
 receiving image data from the vehicle camera, the image data comprising image frames;
 assigning transition values, which indicate whether there is a clearly recognizable intensity transition from dark to bright or from bright to dark at a corresponding pixel location of the frame, to pixels of the image frames;
 assigning three-dimensional coordinates to the pixels using a model of the exterior scene; and
 using the assigned three-dimensional coordinates and movement data of the vehicle to assign trajectories to the pixels, the movement data being provided by one or more vehicle sensors, wherein a trajectory comprises pixels of a set of adjacent image frames, wherein the trajectory may extend forwards or backwards in time;
 for those pixels to which a trajectory is assigned:
  computing an expectation value for the pixel, the expectation value being derived from a transition value of a starting pixel of the trajectory;
  computing a satisfied transition value for the pixel location, the satisfied transition value being derived from transition values along the trajectory for a set of frames that are adjacent to the frame of the starting pixel,
  accumulating the expectation value and the satisfied transition value over time; and
  deriving a cleanliness value from a ratio of the accumulated satisfied transition value to the accumulated expectation value.

2. An evaluation unit, the evaluation unit comprising:
 an input connection for receiving image data;
 a buffer for storing a predetermined number of image frames;
 wherein the evaluation unit is operative to
  receive image data from the vehicle camera via the input connection, the image data comprising images frames,
  assign transition values using a transition indicator, which indicate whether there is a clearly recognizable intensity transition from dark to bright or from bright to dark at a corresponding pixel location of the frame, to pixels of the image frames,
  assign three-dimensional coordinates to the pixels using a model of the exterior scene, and
  use the assigned three-dimensional coordinates and movement data of the vehicle to assign trajectories to the pixels, the movement data being provided by one or more vehicle sensors, wherein a trajectory comprises pixels of a set of adjacent image frames, wherein the trajectory may extend forwards or backwards in time,
 wherein for those pixels to which a trajectory is assigned, the evaluation unit is further operative to
  compute an expectation value for the pixel, the expectation value being derived from a transition value of a starting pixel of the trajectory,
  compute a satisfied transition value for the pixel location, the satisfied transition value being derived from transition values along the trajectory for a set of frames in the buffer that are adjacent to the frame of the starting pixel,
  accumulate the expectation value and the satisfied transition value over time,
  derive a cleanliness value from a ratio of the accumulated satisfied transition value to the accumulated expectation value.

3. The evaluation unit according to claim 2, wherein the buffer for storing the image frames is a circular buffer.

4. The evaluation unit according to claim 2, further comprising a first memory area for storing an array of accumulated expectation values and a second memory area for storing an array of satisfied transition values, wherein an element of the respective array corresponds to a pixel location.

5. The evaluation unit according to one of the claim 2, wherein the evaluation unit is operative to:
 compare the accumulated expectation value with a pre-determined threshold,
 set the cleanliness value of the pixel to the ratio of the accumulated satisfied transition value to the accumulated expectation value, if the expectation value is greater than the pre-determined threshold, and
 represent the cleanliness value of the pixel as "undetermined" if the expectation value is less than the pre-determined threshold.

6. The evaluation unit according to claim 2, wherein the evaluation unit is operative to compute the transition values as a two-dimensional convolution of a filter with pixels of an image frame pixel.

7. The evaluation unit according to claim 2, wherein the evaluation unit is operative to compare the pixel transition values with a detection threshold and to set the respective transition value to one if the respective transition value is equal or greater than the detection threshold.

8. The evaluation unit according to claim 2, wherein the evaluation unit is operative to
 divide the image frames into disjoint subregions and compute low resolution transition values by selecting maximum values of the transition values in the subregions,
 store the low-resolution transition values in the buffer for a predetermined number of image frames, and
 use the low-resolution transition values to compute the corresponding expectation values and the corresponding satisfied transition values.

9. The evaluation unit according to claim 2, wherein the evaluation unit is operative to receive and process movement data from a vehicle speed sensor and from a steering angle sensor.

10. The evaluation unit according to claim 2, wherein the evaluation unit is operative to receive and to process movement data at least one camera sensor.

11. The evaluation unit according to claim 2, wherein the evaluation unit is operative to assign motion vectors to the pixels of the image frames according to a simplified model of a surrounding scene, the simplified model comprising a horizontal ground surface, a first region of vertical objects and a second region of vertical objects.

12. The evaluation unit according to claim 2, wherein the evaluation unit is operative to identify frames for which the vehicle is moving essentially in a straight line, and to update the expectation value and the satisfied transition value for the identified frames.

13. A vehicle comprising:
at least one vehicle camera,
an evaluation unit in communication with the at least one vehicle camera, the evaluation unit comprising:
  an input connection for receiving image data from the at least one vehicle camera;
  a buffer for storing a predetermined number of image frames;
  wherein the evaluation unit is operative to
    receive image data from the vehicle camera via the input connection, the image data comprising images frames,
    assign transition values using a transition indicator, which indicate whether there is a clearly recognizable intensity transition from dark to bright or from bright to dark at a corresponding pixel location of the frame, to pixels of the image frames,
    assign three-dimensional coordinates to the pixels using a model of the exterior scene, and
    use the assigned three-dimensional coordinates and movement data of the vehicle to assign trajectories to the pixels, the movement data being provided by one or more vehicle sensors, wherein a trajectory comprises pixels of a set of adjacent image frames, wherein the trajectory may extend forwards or backwards in time,
  wherein for those pixels to which a trajectory is assigned, the evaluation unit is further operative to
    compute an expectation value for the pixel, the expectation value being derived from a transition value of a starting pixel of the trajectory,
    compute a satisfied transition value for the pixel location, the satisfied transition value being derived from transition values along the trajectory for a set of frames in the buffer that are adjacent to the frame of the starting pixel,
    accumulate the expectation value and the satisfied transition value over time,
  derive a cleanliness value from a ratio of the accumulated satisfied transition value to the accumulated expectation value.

14. The vehicle according to claim 13, wherein the evaluation unit is operative to receive and process movement data from a vehicle speed sensor and from a steering angle sensor.

* * * * *